United States Patent [19]

Dörr et al.

[11] Patent Number: 4,834,954

[45] Date of Patent: May 30, 1989

[54] PROCESS FOR CLEANING FLUE GASES

[75] Inventors: Karl H. Dörr; Hugo Grimm; Heinz Neumann, all of Frankfurt am Main; Rudolf Gerken; Günter Lailach, both of Krefeld, all of Fed. Rep. of Germany

[73] Assignees: Bayer Aktiengesellschaft, Leverkusan; Metallgesellschaft Aktiengesellschaft, Frankfurt am Main, both of Fed. Rep. of Germany

[21] Appl. No.: 67,658

[22] Filed: Jun. 26, 1987

[30] Foreign Application Priority Data

Jul. 19, 1986 [DE] Fed. Rep. of Germany ....... 3624461

[51] Int. Cl.$^4$ ................................ C01B 17/00
[52] U.S. Cl. ..................... 423/242; 423/522
[58] Field of Search ................ 423/242 R, 242 A, 522

[56] References Cited

U.S. PATENT DOCUMENTS

| | | | |
|---|---|---|---|
| 2,906,372 | 9/1959 | Leonard et al. | 423/242 |
| 4,136,153 | 1/1979 | Robertsen et al. | 423/242 |
| 4,542,621 | 9/1985 | Anderson et al. | 423/242 |
| 4,543,110 | 9/1985 | Engelhandt et al. | 423/242 |

FOREIGN PATENT DOCUMENTS

| | | |
|---|---|---|
| EP0150282 | 8/1985 | European Pat. Off. . |
| EP0191725 | 8/1986 | European Pat. Off. . |
| 1234912 | 2/1967 | Fed. Rep. of Germany . |
| 2304784 | 8/1978 | Fed. Rep. of Germany . |

*Primary Examiner*—Gregory A. Heller
*Attorney, Agent, or Firm*—Sprung Horn Kramer & Woods

[57] ABSTRACT

Cleaned flue gases normally accumulate as steam-saturated gases with temperatures of from 40° to 55° C. after wet cleaning processes for the removal of sulfur and/or nitrogen compounds. Before being let off through a stack, however, these gases have to be heated to at least 72° C.

This invention relates to a process for reheating flue gases after wet cleaning.

6 Claims, 4 Drawing Sheets

PROCESS FOR CLEANING FLUE GASES

BACKGROUND OF THE INVENTION

This invention relates to a process for reheating flue gases after wet cleaning.

Cleaned flue gases normally accumulate as steam-saturated gases with temperatures of from 40° to 55° C. after wet cleaning processes for the removal of sulfur and/or nitrogen compounds. Before being let off through a stack, however, these gases have to be heated to at least 72° C. This heating preferably takes place in heat exchangers using the heat content of the crude gas. The attendant problems caused by corrosion and contamination are known (cf. "Dokumentation Rauchgasreinigung", VDI-Verlag, Sept. 1985). Even more problematical is the heating of wet-desulfurized flue gases to 100°-140° C. to denitrogenize them on active carbon catalysts.

In cases where the gases are reheated in a regenerative heat exchanger with a rotating storage medium (gas preheating device), large temperature differences have to be maintained between the hot untreated gas and the reheated clean gas. The unavoidable leakage losses are a particular disadvantage.

High-grade primary energy in the form of fuel gas or oil is required for heating of the clean gas by means of burners.

SUMMARY OF THE INVENTION

The object of the present invention is to provide a process which does not have the described disadvantages of known processes.

Surprisingly, this object is achieved simply and economically by a process in which the flue gases are heated by contact with 50–80% sulfuric acid.

Accordingly, the present invention relates to a process for reheating flue gases after wet cleaning which is characterized in that the flue gases are reheated by contact with 55–80% sulfuric acid.

In this way, it is possible to reheat the clean gas from 40°–55° C. to 70°–150° C. after wet desulfurization and/or denitrogenization.

The process according to the invention may be applied with particular advantage in cases where the flue gases to be heated contain at least 90% relative humidity at temperatures of from 40° to 55° C.

In one particular preferred embodiment of the process according to the invention, the reheating of the flue gases is carried out by re-evaporation of the water condensed in the sulfuric acid by contact of this sulfuric acid with hot flue gas. The energy required for reheating of the flue gas may advantageously be taken from the hot flue gas (crude gas).

Equally, however, it can also be of advantage to supply the energy required for reheating of the flue gas completely or partly through heat exchangers to the relatively dilute sulfuric acid before this acid is contacted with hot flue gas.

The process according to the invention is suitable in principle for reheating all the various flue gases which accumulate after wet cleaning. In particular, it may be applied in combination with flue gas desulfurization processes of the type described, for example, in DE-A No. 34 35 931.

In another advantageous embodiment of the process according to the invention, the solids deposited during contact of the hot flue gas with the sulfuric acid are separated off from a partial stream of the sulfuric acid.

BRIEF DESCRIPTION OF THE DRAWINGS

Various possible embodiments of the process according to the invention are illustrated in FIGS. 1 to 4, which are schematic representations of different embodiments of the invention.

DETAILED DESCRIPTION OF THE INVENTION

Figure 1A:
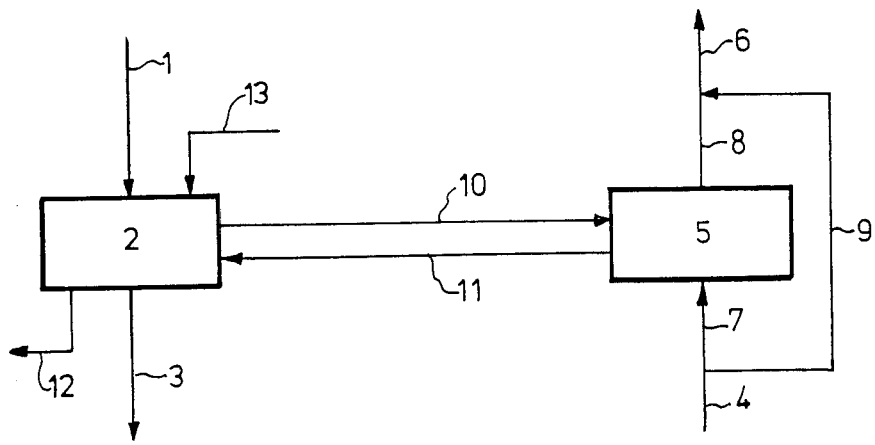

FIG. 1a shows the most simple embodiment in conjunction with a process for the wet desulfurization and/or wet denitrogenization of flue gases. The crude gas 1 is scrubbed with 55–70% sulfuric acid at 80°–120° C. in a scrubber 2. The dust-form impurities of the crude gas and sulfur trioxide are deposited in the sulfuric acid. At the same time, the flue gases are cooled from 130°–170° C. to 80°–120° C. by evaporation of water from the sulfuric acid. The precleaned flue gases 3 are delivered to the actual flue gas cleaning plant. The clean gas 4 saturated with steam at 40°–55° C. is brought into contact with 55–75% sulfuric acid in a scrubber 5, the clean gas being heated to 80°–120° C. by condensing steam. The reheated flue gas 6 may be let off through a stack or delivered to a denitrogenization unit. Where it is let off through a stack, a temperature of only 72°–80° C. is sufficient. In this case, it can be of particular advantage, with a view to reducing the size of the scrubber 5, to heat only a partial stream 7 to a relatively high temperature and to mix the heated partial stream 8 with the untreated clean gas partial stream 9 before introduction into the stack. The scrubber 5 is advantageously fed with sulfuric acid of relatively high concentration 10 from the sump of the scrubber 2 while the scruber 2 is fed with sulfuric acid of relatively low concentration 11 from the sump of the scrubber 5. The concentration of the acid stream 10 is normally around 0.5 to 5% higher than that of the acid stream 11.

Since dust-form constituents of the crude gas are deposited in the sulfuric acid in the scrubber 2, a partial stream 12 is run off from the system in accordance with the invention and filtered or otherwise separated from solids to avoid problems through accumulation of the solids. The filtrate 13 is returned to the system.

Figure 1B:
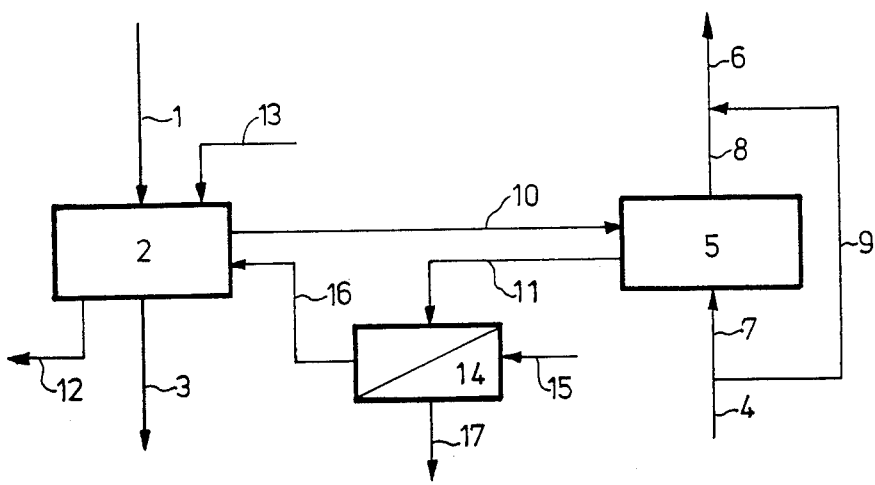

FIG. 1b shows a variant of the process according to the invention which provides for greater variability in regard to the temperatures of the heated flue gas 6 and the scrubbed crude gas 3. The flue gas 4 is again reheated by condensation of steam during scrubbing 5 with 55–80% sulfuric acid 10. However, the heat required for re-evaporation of water condensed in the scrubber 5 is not taken (or is only partly taken) from the crude gas 1, instead it is completely (or partly) supplied to the relatively dilute sulfuric acid 11 in the heat exchanger 14 which is heated with steam 15. The quantity of water condensed in the scrubber 5 is evaporated from the acid 16 heated by about 1 to 10K in the scrubber 2 during contact with the crude gas 1. The steam condensate 17 may be used as process water or boiler feed water. Although the embodiment shown in FIG. 1b requires steam as additional energy, it does enable the flue gas stream as a whole to be heated to temperatures of up to 140° C. through a higher possible concentration of acid, which is of advantage for example for catalytic denitrogenization on active carbon. Suitable scrubbers are the known types, such as scrubbing towers, jet scrubbers or Venturi scrubbers. A droplet separator is advantageously installed behind each scrubber.

Figure 2:
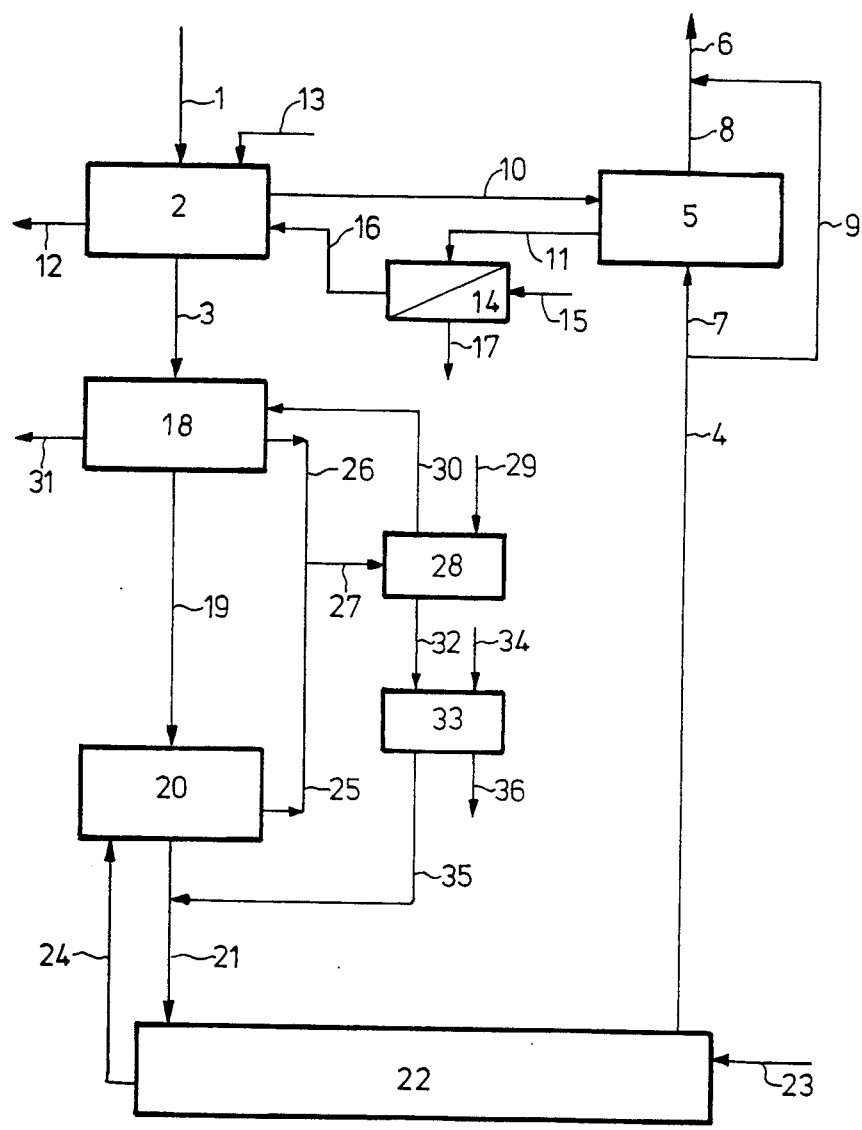

FIG. 2 shows a particularly advantageous application of the process according to the invention in direct combination with a catalytic flue gas desulfurization according to DE-A No. 34 35 931. The pre-cleaned crude gas 3 is scrubbed with 55–75% sulfuric acid in a scrubber 18, the gas 19 being cooled to 80°–120° C. through evaporation of water from the sulfuric acid. The gas is cooled to 48°–55° C. by scrubbing with 5–25% sulfuric acid in a scrubber 20. At the same time, HCl and HF are largely removed from the gas. The cooled and precleaned flue gas 21 is passed through an active carbon reactor 22 in which $SO_2$ is catalytically reacted with oxygen and water to sulfuric acid. The desulfurized flue gas 4, saturated with steam at 47°–53° C., is passed through the scrubber 5 for reheating. The sulfuric acid formed on the active carbon in the reactor 22 is washed out as 3–20% dilute sulfuric acid 24 by spraying the carbon with water 23 and introduced into the scrubber 20. Here, it is concentrated by evaporation of water to an $H_2SO_4$ content of 5–25% in contact with the flue gas 19. The 5–25% sulfuric acid 25 containing HCl and HF is mixed with 55–75% sulfuric acid 26 from the scrubber 18 in such a ratio that a 40–60% mixture 27 is obtained which is fed into a stripper 28. In the stripper 28, HCl and HF are blown out of the sulfuric acid with air 29 or a partial stream of the flue gas 19. The sulfuric acid 30 substantially free from HCl and HF is introduced into the scrubber 18 and concentrated to an $H_2SO_4$-content of 55–75% by contact with the flue gas 3. Pure sulfuric acid of this concentration is discharged from the scrubber 18 as economically useable acid 31. The gas 32 laden with HCl and HF issuing from the stripper 28 is scrubbed with a scrubbing liquid 34 in a scrubber 33 and then delivered 35 to the active carbon reactor 22. HCl and HF are removed from the system 36 with the scrubbing liquid (for example water or hydrohalic acid).

Figure 3:
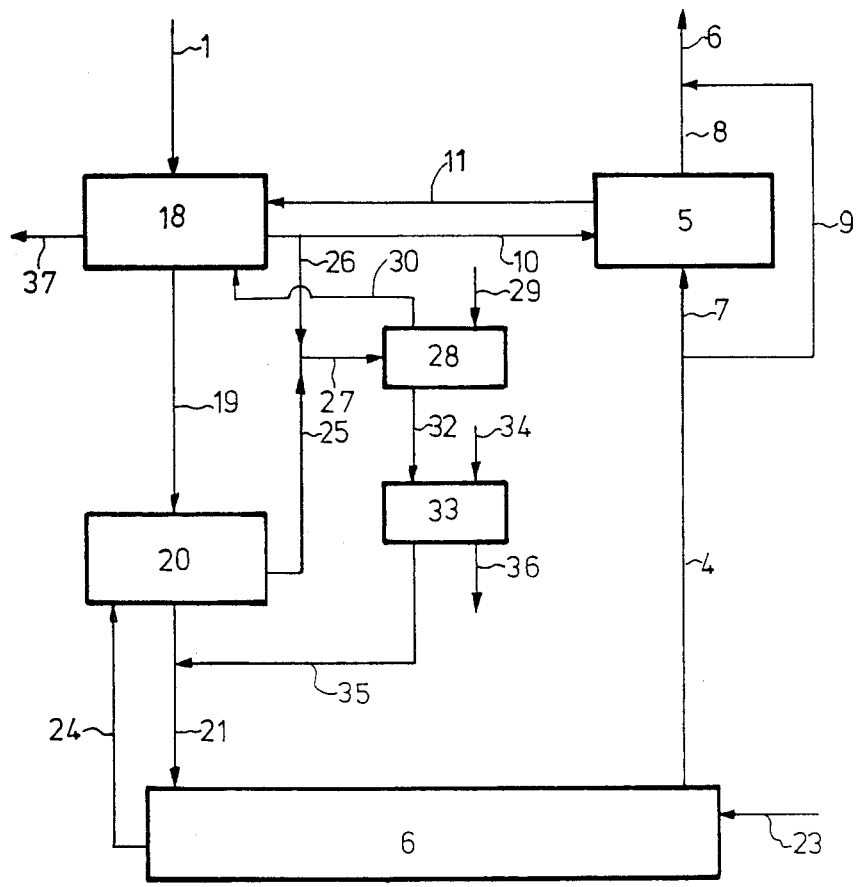

FIG. 3 shows a particularly simple (in terms of apparatus) combination of the process according to the invention for reheating flue gases with the desulfurization process according to DE-A No. 34 35 931. This combination may be applied above all when the sulfur dioxide content of the crude gas is relatively low. The desulfurization process corresponds to that in FIG. 2, except that there is no precleaning in the scrubber 2 and no supply of heat by means of steam 15 in the heat exchanger 14. The heat required for evaporation of the water condensed in the scrubber 5, like the heat required for evaporation of the 40–60% sulfuric acid 30 to an $H_2SO_4$ content of 55–75% in the scrubber 18, is taken from the flue gas 1.

In the embodiment shown in FIG. 3, the advantage of less outlay on equipment is offset by less flexibility of the process and by the fact that, instead of a pure sulfuric acid (31, FIG. 2), a solids-containing, impure sulfuric acid 37 is obtained as the desulfurization product.

Figure 4:
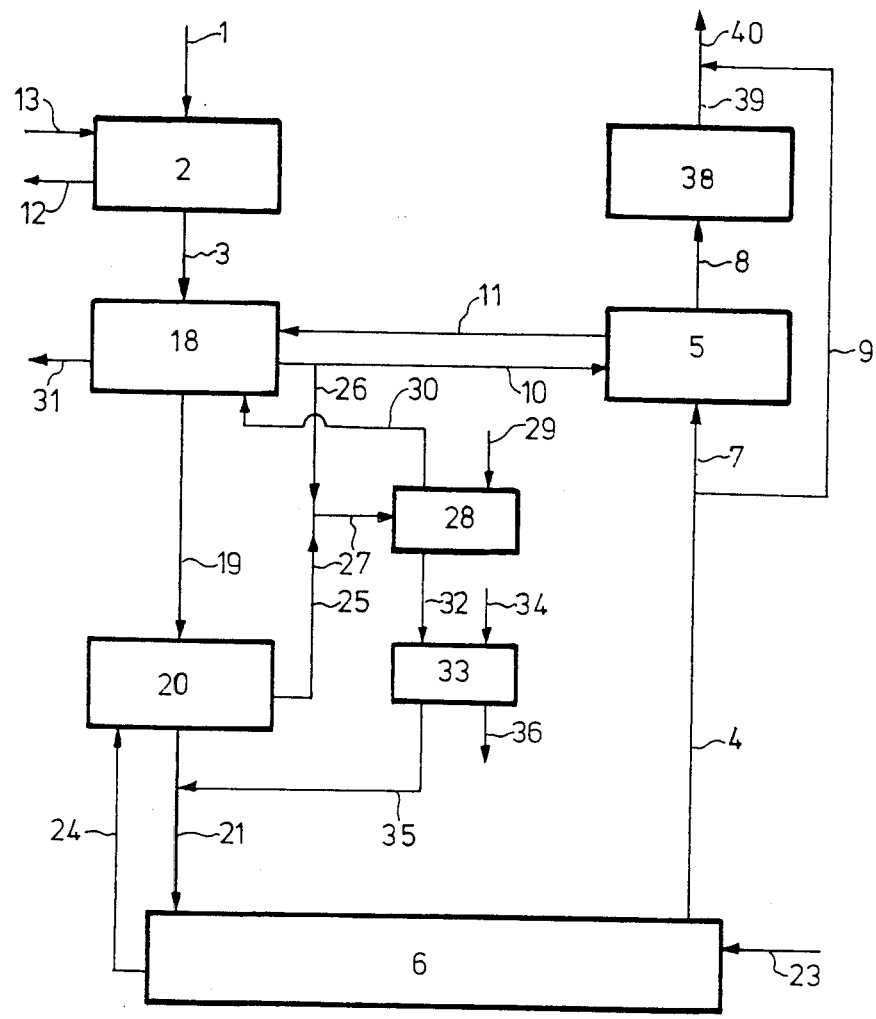

Particular advantages, particularly in regard to the quality of the clean gas, are afforded by the embodiment of the process according to the invention shown in FIG. 4. The scrubber 2 is only used to deposit the dust in 75–80% sulfuric acid. Part of the acid 12 is continuously or periodically removed from the system. After separation of the solids from this part, the acid 13 is recycled to the scrubber. The gas stream 4 as a whole or a partial stream 7 of the clean gas is heated in the scrubber 5 with solids-free acid from the scrubber 18, as previously described. The use of solidsfree sulfuric acid 10 provides for particularly favorable conditions for the deposition of entrained acid droplets from the heated gas stream 8. In particular, the droplet separator 38 may also be equipped to advantage with glass fiber filter candles for the complete deposition of fine spray. The heated clean gas may be let off into the atmosphere 40 without any problems, optionally after mixing with a non-heated partial stream 9.

The process variants described above represent possible embodiments of the process according to the invention without limiting the invention in any way. Combinations of these embodiments and variations within the scope of the invention are possible. The advantages of the process according to the invention are further illustrated by the following Examples.

EXAMPLE 1

The clean gas is reheated using part of the crude gas heat as shown in FIG. 1a. 300,000 m$^3$/h flue gas 1 containing 7.8% moisture, 3 g $SO_2$/m$^3$, 200 mg HCl/m$^3$, 15 mg HF/m$^3$ and 50 mg dust/m$^3$ (all volume figures based on standard conditions) are scrubbed in countercurrent with 300 m$^3$/h 64% sulfuric acid 11 in a scrubbing tower 2 comprising two spray grids arranged one above the other, the crude gas 1 being cooled from 130° to 90° C. After flowing through a droplet separator, the dust-free gas 3 containing 9.9% moisture is transported to the desulfurization and/or denitrogenization plant. 6t/h $H_2O$ are evaporated from the acid during the contact with sulfuric acid.

The sulfuric acid 10 concentrated to an $H_2SO_4$ content of 64.8% in the scrubbing tower 2 is removed from the sump of the scrubbing tower and fed into the scrubbing tower 5 through which the clean gas flows in counter-current to the sulfuric acid. The steam-saturated clean gas 4 has a temperature of 50° C. and a moisture content of 12.1%, corresponding to a relative humidity of 100%. The clean gas is heated to around 89° C. by steam condensation and, to a minor extent, by transfer of sensible heat from the sulfuric acid. The reheated clean gas 6 is let off into the stack through a droplet separator.

The sulfuric acid from the sump of the scrubbing tower 5 is delivered to the scrubbing tower 2 for spraying. The solids are separated off from the sulfuric acid circuit by filtration or sedimentation, for which purpose it is sufficient to treat partial stream 12 which, after separation of the solids, is fed back into the system 13.

EXAMPLE 2

A crude gas stream 1 having the same composition as in Example 1 accumulates at a temperature of 150° C. It is desulfurized in accordance with DE-A No. 34 35 931. The clean gas is intended to be heated to 75° C. before introduction into the stack. 350 m$^3$ natural gas/h (i.N.) were provided for heating by burners.

By application of the process according to the invention, reheating is effected by means of part of the crude gas heat (corresponding to FIG. 3). In the scrubbing tower 5, only half 7 the clean gas 4 is heated from 51° to 100° C. in contact with 69% sulfuric acid 10. By mixing the heated partial stream 8, which contains only 10.5% moisture, with the steam-saturated partial stream 9 of clean gas 4, a temperature of 75° C. is obtained on introduction of the clean gas 6 into the stack. By condensation of 2.8 t $H_2O$/h in the scrubbing tower 5, the sulfuric acid (190 t/h) is diluted to an $H_2SO_4$ content of 68%. In the scrubbing tower 18, in which the condensed water is re-evaporated, 4.7 t H₂O/h are additionally evaporated from the sulfuric acid 30 which accumulates during desulfurization in accordance with DE-A No. 34 35 931. The dust deposited from the crude gas is removed from the system with the 69% sulfuric acid 37 accumulating and may be separated therefrom.

In the scrubbing tower 18, the crude gas is cooled from 150° to 102° C. It is transported with a moisture content of 10.4% to the flue gas desulfurization unit 19.

EXAMPLE 3

Flue gas with a temperature of 130° C. is intended to be desulfurized in accordance with DE-A No. 34 35 931 while the clean gas is intended to be heated to 110° C. for denitrogenization using an active carbon catalyst. Since the crude gas heat is used for evaporation of the sulfuric acid which accumulates during desulfurization, reheating is intended to be carried out with steam. The composition of the crude gas corresponds to Example 1. Reheating takes place in accordance with FIG. 1b. From 300,000 m³/h clean gas 4 having a moisture content of 13.8% and a temperature of 52° C., a partial stream 7, corresponding to 75% of the total clean gas, is passed through a scrubbing tower 5 in which it is brought into contact with 330 m³/h 77.8% sulfuric acid 10. By condensation of 8 t H₂O/h from the clean gas, the clean gas is heated to 128° C. The heated clean gas 8 is mixed with the untreated clean gas partial stream 9 and delivered 6 at a temperature of 110° C. to the decontamination unit. The sulfuric acid 10 is diluted to 76.6% H₂SO₄ in the scrubbing tower 5 and cooled to 128° C. From the sump of the scrubbing tower 5, this acid 11 is passed through a heat exchanger 14 from which it emerges with a temperature of 153° C. and is fed 16 into the scrubbing tower 2. The heat exchanger is heated with 10 bar steam 15; the condensate 17 may be re-used in the generation of steam. In the scrubbing tower 2, 8 t H₂O/h are evaporated from the sulfuric acid 16 and the dust is washed out from the crude gas 1. Thereafter the crude gas 3 has a temperature of 130° C. and a moisture content of 10.5%. From a partial stream 12, the dust is separated off and the dust-free acid 13 is recycled to the scrubbing tower 2.

What is claimed is:

1. In a process for cleaning flue gases, comprising wet cleaning hot crude flue gas for removing at least one of sulfur and nitrogen compounds to obtain steam saturated clean flue gas at a temperature of from 40° to 50° C. and reheating the clean gas to at least 72° C. and letting off the reheated clean flue gas through a stack, the improvement wherein the step of reheating comprises contacting the steam saturated clean flue gas in a scrubber with 55 to 80% sulfuric acid.

2. A process as claimed in claim 1, wherein the clean gas to be reheated contains at least 90% relative humidity at temperatures of from 40° to 50° C.

3. A process as claimed in claim 1 or 2, wherein the gas is reheated by condensation of water in the sulfuric acid and the condensed water is re-evaporated by contact of the sulfuric acid with hot flue gas.

4. A process as claimed in claim 1, further comprising using energy from the hot crude flue gas to reheat the clean gas.

5. A process as claimed in claim 1, further comprising at least partly supplying energy for reheating to the sulfuric acid through heat exchangers before the acid is contacted with flue gas.

6. A process as claimed in claim 1, further comprising separating solids deposited during the contact of the flue gas with the sulfuric acid from a partial stream of the sulfuric acid.

* * * * *